United States Patent
Melakari et al.

(10) Patent No.: US 10,270,947 B2
(45) Date of Patent: Apr. 23, 2019

(54) FLAT DIGITAL IMAGE SENSOR

(71) Applicant: Microsoft Technology Licensing, LLC, Redmond, WA (US)

(72) Inventors: Klaus Melakari, Oulu (FI); Mikko Juhola, Salo (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 127 days.

(21) Appl. No.: 15/267,135

(22) Filed: Sep. 15, 2016

(65) Prior Publication Data
US 2018/0077322 A1 Mar. 15, 2018

(51) Int. Cl.
H04N 5/225 (2006.01)
G02B 3/00 (2006.01)
H04N 5/232 (2006.01)

(52) U.S. Cl.
CPC ......... *H04N 5/2253* (2013.01); *G02B 3/0056* (2013.01); *H04N 5/2254* (2013.01); *H04N 5/23229* (2013.01)

(58) Field of Classification Search
None
See application file for complete search history.

(56) References Cited

U.S. PATENT DOCUMENTS

| | | | |
|---|---|---|---|
| 4,251,160 A | 2/1981 | Bouwhuis et al. | |
| 4,354,111 A | 10/1982 | Williams et al. | |
| 4,966,446 A | 10/1990 | Huang et al. | |
| 5,473,453 A * | 12/1995 | Kurematsu | ....... G02F 1/133512 349/110 |
| 5,838,428 A | 11/1998 | Pipitone et al. | |
| 6,329,987 B1 | 12/2001 | Gottfried et al. | |

(Continued)

FOREIGN PATENT DOCUMENTS

CN 103384300 A 11/2013
EP 1377039 A2 1/2004
(Continued)

OTHER PUBLICATIONS

"International Search Report and Written Opinion Issued in PCT Application No. PCT/US2017/051036", dated Dec. 1, 2017, 12 Pages.

(Continued)

*Primary Examiner* — Cynthia Segura

(57) ABSTRACT

An apparatus comprises a processing unit configured to obtain preliminary image data of a preliminary digital image frame captured by a digital image sensor having comprising a sensor layer comprising a pixel array; a mask layer comprising an array of micro apertures positioned within aperture sites corresponding the positioning and size of the light sensitive pixels, and a lens layer comprising an array of micro lenses positioned within lens sites. The micro apertures are positioned in the aperture sites at aperture positions defined by an aperture density function. The processing unit is further configured to obtain the aperture density function; and a position difference between prevailing positioning of the mask layer in relation to the lens layer from a reference relative positioning thereof; and to reconstruct, on the basis of the preliminary image data, the position difference, and the aperture density function, an output digital image frame.

20 Claims, 8 Drawing Sheets

(56) References Cited

U.S. PATENT DOCUMENTS

| | | | |
|---|---|---|---|
| 6,700,702 | B2 | 3/2004 | Sales |
| 6,871,337 | B2 | 3/2005 | Socha |
| 6,967,779 | B2 | 11/2005 | Fadel et al. |
| 8,106,906 | B1 * | 1/2012 | Duff ................ G06T 15/50 345/419 |
| 8,199,244 | B2 | 6/2012 | Baraniuk et al. |
| 8,493,496 | B2 | 7/2013 | Freedman et al. |
| 8,624,961 | B2 * | 1/2014 | Li .................... G02B 27/26 345/103 |
| 8,889,244 | B2 * | 11/2014 | Mizuno ............... G06F 3/044 345/173 |
| 9,525,833 | B2 * | 12/2016 | Hamada ........... H04N 5/23212 |
| 2003/0128338 | A1 * | 7/2003 | Hirata ................ G03B 17/50 353/31 |
| 2003/0222196 | A1 * | 12/2003 | Hutchin ............... G01J 9/00 250/201.9 |
| 2006/0061869 | A1 * | 3/2006 | Fadel ................ G02B 3/0031 359/619 |
| 2007/0109438 | A1 | 5/2007 | Duparre et al. |
| 2007/0134567 | A1 * | 6/2007 | Park .................. C23C 14/042 430/5 |
| 2009/0179142 | A1 | 7/2009 | Duparre et al. |
| 2009/0273843 | A1 * | 11/2009 | Raskar ............. G02B 27/0018 359/601 |
| 2010/0110272 | A1 * | 5/2010 | Sugawara ......... H04N 5/23212 348/341 |
| 2010/0277805 | A1 * | 11/2010 | Schilling ............ G02B 3/0043 359/619 |
| 2010/0328433 | A1 * | 12/2010 | Li .................... G02B 27/26 348/46 |
| 2011/0001871 | A1 * | 1/2011 | Shintani ............... G02B 7/34 348/360 |
| 2011/0026141 | A1 * | 2/2011 | Barrows ............. H04N 5/2254 359/737 |
| 2011/0228142 | A1 | 9/2011 | Brueckner et al. |
| 2012/0162457 | A1 | 6/2012 | Veeraraghavan et al. |
| 2012/0224096 | A1 * | 9/2012 | Shimoda ................ G02B 7/36 348/349 |
| 2013/0070138 | A1 * | 3/2013 | Baraniuk ............. H04N 5/335 348/302 |
| 2013/0099097 | A1 * | 4/2013 | Isobe ................. G01J 5/34 250/208.1 |
| 2013/0128087 | A1 * | 5/2013 | Georgiev ............ H04N 5/2254 348/307 |
| 2013/0294089 | A1 | 11/2013 | Freedman et al. |
| 2014/0049663 | A1 * | 2/2014 | Ng ..................... G02B 3/0056 348/222.1 |
| 2014/0146201 | A1 * | 5/2014 | Knight ................. H04N 9/04 348/231.99 |
| 2014/0240721 | A1 | 8/2014 | Herschbach |
| 2015/0009373 | A1 * | 1/2015 | Takahashi ........... H04N 5/3696 348/272 |
| 2015/0281543 | A1 * | 10/2015 | Wen ................... H03M 7/3062 348/222.1 |
| 2015/0288859 | A1 * | 10/2015 | Uliyar ................. H04N 5/2254 348/340 |
| 2017/0038573 | A1 * | 2/2017 | Uhl .................... G02B 21/0044 |
| 2017/0315273 | A1 * | 11/2017 | Tagawa ............... G02B 3/0056 |
| 2018/0046837 | A1 * | 2/2018 | Gozzini .............. G06K 9/0004 |

FOREIGN PATENT DOCUMENTS

| | | |
|---|---|---|
| WO | 2004109341 A2 | 12/2004 |
| WO | 2009023949 A2 | 2/2009 |
| WO | 2013190171 A1 | 12/2013 |

OTHER PUBLICATIONS

Asif, et al., "FlatCam: Thin, Bare-Sensor Cameras using Coded Aperture and Computation", In Journal of the Computing Research Repository, Sep. 2015, pp. 1-12.

T Zand, Jean In, "Coded aperture camera imaging concept", Published on: Mar. 7, 1996, 6 pages, Available at: http://universe.gsfc.nasa.gov/archive/cai/coded_intr.html.

Alvarez, et al., "High Resolution Images from a Sequence of Low Resolution Observations", In Proceedings of Digital Image Sequence Processing: Compression and Analysis, Jul. 2004, pp. 1-31.

Gaidhani, Pradeep, "Super-resolution", Published on: Sep. 7, 2012, 9 pages, Available at: http://homepages.inf.ed.ac.uk/rbf/CVonline/LOCAL_COPIES/AV1011/Super_Resolution_CVonline.pdf.

Hardie, et al., "High Resolution Image Reconstruction From a Sequence of Rotated and Translated Frames and its Application to an Infrared Imaging System", In Journal of Optical Engineering, vol. 37, Issue 1, Jan. 1998, pp. 1-27.

Duparre', et al.,"Artificial apposition compound eye fabricated by micro-optics technology", In Applied Optics, vol. 13, No. 22, Aug. 1, 2004, 8 pages.

Duparre', et al., "Artifical compound eyes—different concepts and their application to ultra flat image acquisition sensors", In Proceedings of SPIE—The International Society for Optical Engineering, Jan. 2004, 12 pages.

* cited by examiner

FLAT DIGITAL IMAGE SENSOR

BACKGROUND

Flat digital image sensor designs with an array of light sensitive pixels, mask layer with an array of micro apertures, and a lens layer with an array of micro lenses superposed on each other, may enable implementation of very thin digital camera assemblies allowing, for example, integrating a digital camera within a display assembly. In such thin and flat digital image sensor, each pixel may have a partial field of view with a width and direction determined by a micro aperture and a micro lens associated with it. The entire field of view of the image sensor may be formed by the partial fields of view of pixels.

Micro lens arrays and mask layers with micro aperture arrays with predetermined positioning of the micro lenses and openings, respectively, may be manufactured with high accuracy. However, imaging performance of a flat digital image sensor may be very sensitive to relative positioning of the mask layer and the pixel array. Even a small deviation from a designed relative positioning may affect the image quality strongly.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An apparatus is disclosed which comprises a processing unit which is configured to obtain preliminary image data which is image data of a preliminary digital image frame captured of an object scene by a digital image sensor which may be a flat digital image sensor.

The digital image sensor used for capturing the preliminary digital image frame comprises a sensor layer comprising an array of light sensitive pixels; a mask layer in front of the sensor layer, the mask layer comprising an array of micro apertures positioned within aperture sites corresponding the positioning and size of the light sensitive pixels, and a lens layer comprising an array of micro lenses in front of the mask layer, the micro lenses being positioned within lens sites corresponding the positioning and size of the light sensitive pixels, wherein a pixel of the sensor layer has a partial field of view defined by a micro aperture and a micro lens associated with the pixel, the partial field of view having a direction of view defined by relative horizontal position of the associated micro aperture in relation to the corresponding micro lens, the overall field of view of the digital image sensor being formed by the partial fields of view of the pixels. The micro apertures are positioned in the aperture sites at aperture positions defined by an aperture density function.

The processing unit is configured to obtain the aperture density function; obtain a position difference between prevailing positioning of the mask layer in relation to the lens layer from a reference relative positioning thereof; and reconstruct, on the basis of the preliminary image data, the position difference, and the aperture density function, an output digital image frame representing the object scene.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

DETAILED DESCRIPTION

The detailed description provided below in connection with the appended drawings is intended as a description of a number of embodiments and is not intended to represent the only forms in which the embodiments may be constructed, implemented, or utilized.

At least some of the embodiments may allow, for example, increased tolerance for inaccuracies of relative positioning of a mask layer and a lens layer of a flat digital image sensor. Some embodiments may further allow various advantageous image processing operations utilizing parallax between image data originating from different pixel groups of the sensor layer.

Figure 1:
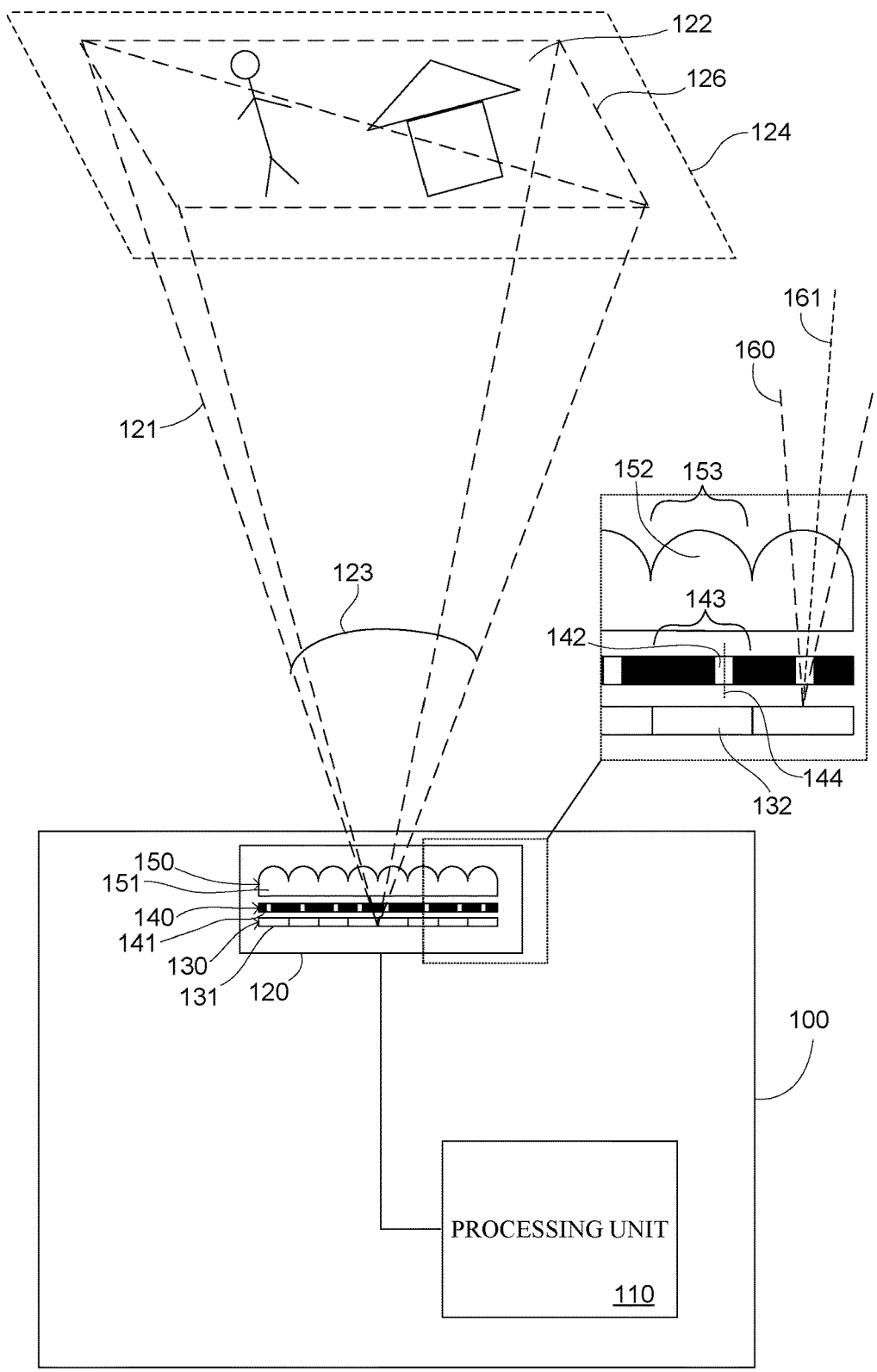
FIG. 1 illustrates schematically an apparatus with a digital image sensor.

The apparatus 100 of FIG. 1 comprises a processing unit 110, and a digital image sensor 120 connected to allow data transfer between the digital image sensor and processing unit.

A "digital image sensor", hereinafter also called as "image sensor" refers to a light sensitive component or element capable of capturing digital image frames of an object scene shot by a digital camera arrangement comprising the image sensor. An image sensor may comprise, for example, a CMOS (Complementary Metal Oxide Semiconductor), a CCD (Charge-Coupled Device) or any other appropriate type of sensor element as an active, light detecting sensor element or sensor layer. Typically, the sensor element or sensor layer is divided into operationally discrete light sensitive sub-elements, such as light sensitive pixels which serve for the actual light sensing operation of receiving light energy and converting the received light energy into electrical signals. One single pixel may comprise different sub-pixels, for example, for different colors.

A "digital image frame", or shortly a "frame", refers to a data content captured via exposure of pixels or some other light sensitive element(s) of an image sensor. A frame thus comprises image data enabling composition of a displayable digital image on the basis of that image data. Image data of a digital image frame may comprise, for example, information about energy and wavelength of light received by pixels of an image sensor. A frame may be captured as a frame for a still image or as one frame of a video sequence or some other frame sequence or group of frames.

An action or operation being carried out "on the basis of" one or more factors refer to those factors being taken into account in that action or operation in such a way that the outcome of the action or operation depends on those factors, those factors thereby affecting the way of carrying out the action or operation. Correspondingly, some entity being defined "based on" or "on the basis of" one or more factors refer to those factors affecting the properties of the thereby defined entity.

The digital image sensor comprises a sensor layer 130 serving for the actual image capturing by receiving light. The sensor layer comprises a pixel array 131, i.e. an array of light sensitive pixels 132.

The digital image sensor further comprises a mask layer 140 in front of the sensor layer 130, the mask layer comprising an aperture array 141, i.e. an array of micro apertures 142 positioned within aperture sites 143 corresponding the positioning and size of the light sensitive pixels. The mask layer may be formed, for example, of some metal or some other material forming an opaque layer. The mask layer may have optically black surfaces to decrease reflections of light therefrom. The mask layer may have a thickness, for example, in a range of 20 µm to some hundreds of micrometers. An "aperture" refers to an opening or hole extending through the mask layer in the thickness direction thereof.

The digital image sensor 120 further comprises a lens layer 150 in front of the mask layer, the lens layer comprising a lens array 151, i.e. an array of micro lenses 152, the micro lenses being positioned within lens sites 153 corresponding the positioning and size of the light sensitive pixels. In the example of FIG. 1, the micro lenses 152 are positioned centrally within the lens sites 153, i.e. the centers of the lenses horizontally aligned with the centers of the lens sites, and cover the entire width of the lens sites. In other embodiments, other types of positioning of lenses in the lens sites may be used, and that positioning may be different for different lenses of the lens array 151. Further, in some embodiments, the lenses can be narrower than the lens sites.

The lens layer may be formed of any appropriate glass for optical components, for example, any appropriate type of crown glasses such as BK 7, with fixed micro lenses formed in or on the lens layer. Alternatively, it may comprise electrically tunable or switchable micro lenses, such an array of liquid crystal micro lenses positioned between two glass plates.

The mask layer being positioned "in front of" the sensor layer refers to positioning of the mask layer on the side of the sensor layer from which side the sensor layer is configured to receive light, i.e. to which side of the sensor layer the image sensor "views", i.e. towards which side has its "viewing direction". This side defines the "front" side of the sensor layer. Correspondingly, the lens layer being positioned in front of the mask layer refers to positioning of the lens layer on the side of the mask layer from which side the mask layer is configured to receive light and pass it to the sensor layer through the micro apertures.

An "aperture site" and a "lens site" refer to an area or region of the mask layer or the lens layer, respectively, within which area or region a micro aperture or a lens is positioned. Correspondence between the positioning and size of those sites and the positioning and size of the light sensitive pixels 132 refers to that the pixels 132 and the aperture/lens sites 143, 153 have same spatial repetition rate, and their centers aligned, i.e. at the same position in the horizontal direction.

"Micro" refers to the maximum dimensions of the pixels, micro apertures and micro lenses in the horizontal directions lying in the micrometer range, i.e. in the range of 1 to 100 µm, preferably in the range of 5 to 50 µm.

"Horizontal" refers to the lateral directions of a fictitious plane along which, i.e. parallel to which, the sensor layer, mask layer, and the lens array extend, i.e. have their "width" dimensions. Correspondingly, "vertical" refers to the direction perpendicular to such plane, i.e. the "thickness" direction of those elements.

The actual image sensor 110 may be considered as a flat image sensor, referring to a sensor type which has a generally flat design, allowing the horizontal dimensions, i.e. the width, of the image sensor to be selected without substantially affecting the overall thickness of the image sensor in the vertical direction. An important feature enabling this is the way of implementing the key optical elements as thin arrays of substantially thin micro lenses, one for one pixel or for a few pixels, instead of one larger lens for the entire array of pixels. Scaling the size of a flat image sensor may be made basically by just adjusting the dimensions and number of elements of the arrays of light sensitive pixels, micro apertures, and micro lenses.

The apparatus of FIG. 1 may be implemented, for example, as a laptop computer, a tablet computer, a smartphone, a mobile phone, and a wearable electronic device, without being limited to these examples. Basically, the apparatus may be of any type of apparatus where a digital image sensor is needed, in particular, an apparatus with only limited thickness available for the image sensor assembly or an apparatus where flat image sensor type is desired for some other reasons.

In the actual image sensor 110 of FIG. 1, for each light sensitive pixel 132, there is a micro aperture 142 and a micro lens 152 associated with it. One single pixel, together with the associated micro aperture and micro lens, forms a partial imaging unit capable of capturing a partial view of an object scene. This is implemented by the pixel of the digital image sensor having a partial field of view 160 which is defined by the micro aperture and a micro lens associated with that pixel.

A partial field of view 160 has a direction of view 161. Being defined by the micro aperture and the micro lens associated with the pixel refers to the direction and the width of the partial field of view resulting from the properties and positioning of the associated micro aperture and the micro lens. For example, the type, shape, and material of the micro lens together with the shape and size of the micro aperture mainly determines the width of the partial field of view.

As for the direction of view 161 of the partial field of view, it is defined by, i.e. the main factor affecting it is, the relative horizontal position of the associated micro aperture in relation to the corresponding micro lens, i.e. the micro lens associated with the same pixel. For example, in the case of a micro aperture lying, i.e. having its aperture position 144, at the center of the aperture site 143, which aperture site in turn is aligned with the corresponding micro lens, the partial field of view may be directed directly forward, i.e. towards the front side of sensor layer, perpendicularly relative to the sensor layer. An offset of the aperture position from the center of the aperture site 143 results in deviation of the direction of view 161 of the partial field of view 160 from that perpendicular forward direction. Thereby, the directions of view of the pixels may be selected by appropriately designing the aperture positions of the mask layer.

The digital image sensor has an overall field of view 121 determining the image area 126 at the object scene 122, i.e. the area of the object scene visible to the digital image sensor. The width of the overall field of view may be defined, for example, as the diagonally defined angular extent 123, of the image area 126 defined by the field of view 121.

The digital image sensor is capable of capturing a preliminary digital image frame of the object scene, image area of the preliminary digital image frame being defined and formed by the overall field of view of the digital image sensor.

Partial fields of view 160 of different pixels of the sensor layer contribute the overall field of view 121 so that at an object plane 124, the overall field of view of the digital image sensor is formed by the partial fields of view of the pixels.

The aperture positions 144 are positioned in the aperture sites in accordance with an aperture density function. The aperture density function may be any type of function mathematically determining the aperture positions, according to which aperture positions the micro apertures are formed in the mask layer during manufacture or formation thereof. The aperture density function may be, for example, a pseudo random or pseudo noise function generally in accordance with what is discussed below with reference to FIG. 6.

The aperture density function may define an aperture position, for example, by means the offset in the aperture position 144 from the center of the aperture site 143. In other embodiments, the aperture density function may be based on any other appropriate way of determining the aperture positions in the aperture sites. Instead of, or in addition to, separately specifying the aperture positions of different aperture sites, the aperture density function may define the locations of the aperture positions site in relation to the aperture position(s) of the adjacent aperture site(s).

The aperture density function may be determined in accordance with any intended micro aperture positioning scheme. That determination may be carried out, for example, automatically, to produce any intended distribution of the partial fields of view of the pixels of the sensor layer. Once determined, the aperture density function may be used in manufacturing of the mask layer by any appropriate manufacturing method.

The aperture density function may advantageously provide information about the positioning of the micro apertures of different aperture sites, and consequently about directions of partial views of view of different pixels of the sensor layer. This information may allow having the partial views of view directed in any appropriate directions, not necessitating that adjacent pixels are viewing adjacent regions or areas in the object scene, and still reconstructing, on the basis of preliminary image data captured of an object scene by the digital image sensor, an output digital image frame representing the object scene. This reconstruction may even be possible irrespective of possible manufacturing inaccuracy resulting in misalignment between the sensor layer and the mask layer.

For such reconstruction, a correlator operator or correlating function may be created on the basis of the aperture density function, which correlator operator or correlating function determines the relationship between the image data of pixels of the preliminary image data and the actual view of the captured object scene. Thereby, pixel mapping may be carried out where the image data of pixels of the preliminary digital image frame may be re-arranged to form an output digital image frame representing the captured object scene.

Figure 2:
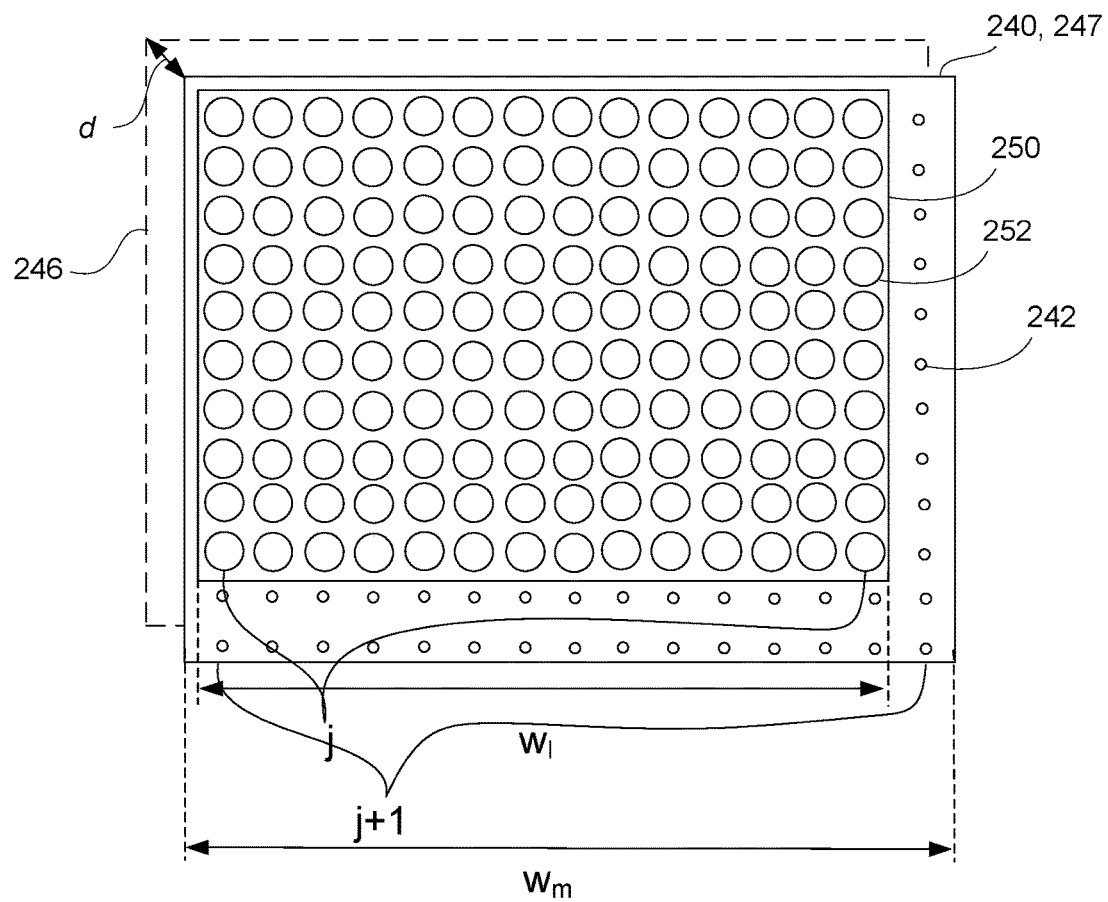
FIG. 2 illustrates schematically a digital image sensor.

As illustrated in FIG. 2, to control the relative positioning between the micro apertures of the mask layer 240 and the micro lenses of the lens layer 250, a reference positioning 246 of the mask layer relative to the lens layer may be determined, according to which the digital image sensor is to be assembled or manufactured. Inaccuracy in the manufacturing or assembling process where the digital image sensor is manufactured may result in a misalignment, i.e. a position difference d, of the prevailing, i.e. the actual or realized positioning 247 of the mask layer relative to the lens layer from the reference relative positioning 246.

Such position difference may result in that the correlation between the image data of a preliminary image data and the actual view of the captured object scene may differ from the assumed correlation. Then, pixel mapping carried out in accordance with a predetermined correlator operator or correlating function, without taking into account such position difference, would not result in true representation of the object scene in the output digital image frame. However, from the aperture density function point of view, a position difference can be considered merely as a phase difference between the aperture density function and the lens array or the sensor array, or between the aperture density function and the image data of the preliminary image frame.

Figure 3:
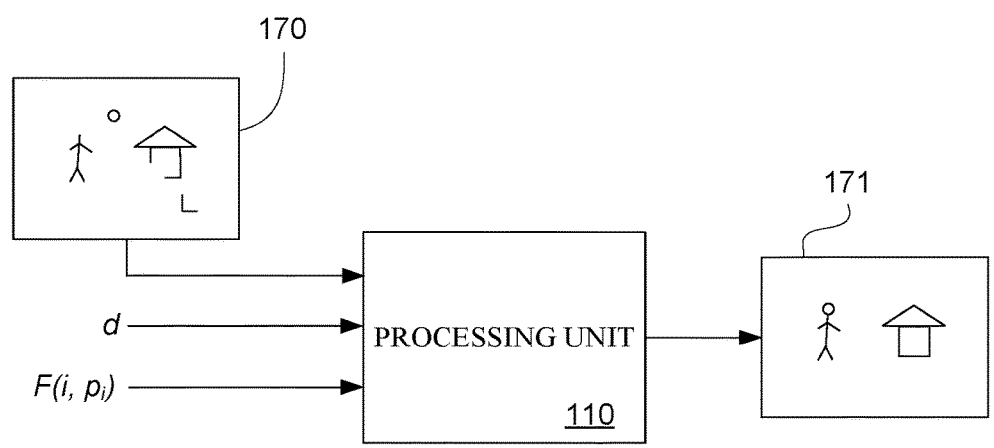
FIG. 3 illustrates schematically operation of the apparatus of FIG. 1.

FIG. 3 illustrates operation of the processing unit 110 of the apparatus of FIG. 1 in reconstruction of an output digital image frame, taking into account such position difference or phase difference.

The processing unit 110 is configured to obtain the aperture density function $F(i, p_i)$ defining, for each micro aperture i, its position $p_i$ in its aperture site. Further, the processing unit is configured to receive the position difference d between the prevailing positioning of the sensor layer relative to the lens layer and a reference relative positioning thereof; and preliminary image data, i.e. image data of a preliminary digital image frame 170 captured of the object scene 122 by the digital image sensor 120 of FIG. 1.

In other embodiments, apparatuses without any digital image sensor may be implemented. Then, a digital image sensor as discussed above, used for capturing the preliminary digital image frame, may be included in some other apparatus or device.

In the preliminary digital image frame 170, the image content is partially mixed so that a part of the object scene imaged by an edge area of the sensor array is located erroneously.

The processing unit is further configured to reconstruct, on the basis of the preliminary image data, the position difference d, and the aperture density function $F(i, p_i)$, an output digital image frame 171 representing the object scene. In the output digital image frame, said mixing is corrected in that the image data of the output digital image frame forms a true representation of the object scene.

The position difference d and the aperture density function may be arranged in any appropriate signal or data type suitable for automatic data processing. Correspondingly, image data of the preliminary and output digital image frame may be constructed in any appropriate digital image frame data format.

The processing unit 110 may be a dedicated unit or sub-unit of a larger unit or module, specifically designed for the above operations. Alternatively, it may be a general purpose unit or sub-unit of the apparatus, also configured to perform other operations and actions.

Being "configured to" perform operations discussed above or below refers to the capability of and suitability of a processing unit for such operations. This may be achieved in various ways. For example, the processing unit may comprise at least one processor and at least one memory coupled to the at least one processor, the memory storing program code instructions which, when run on the at least one processor, cause the processor to perform the action(s) at issue. Alternatively, or additionally, the functionally described features can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The operations which a processing unit discussed above or below are configured to carry out constitute operations of example methods which may be automatically carried out also by other apparatuses of any appropriate types. Further, the methods discussed above or below may be carried out by apparatuses, and processor(s) thereof, which are generally in accordance with any of those discussed above or below. Those apparatuses, in turn, may operate generally in accordance with any of the methods discussed above or below.

The definitions and advantages discussed above or below with reference to any apparatus, device, or processor apply, mutatis mutandis, also to the methods discussed above or below. The same applies vice versa.

Any of the methods discussed above or below may be a computer-implemented method, i.e. a method carried out by a computer or at least one processor and, when appropriate, any appropriate equipment, such as suitable digital image sensor, connected to the computer or the at least one processor.

Figure 4:
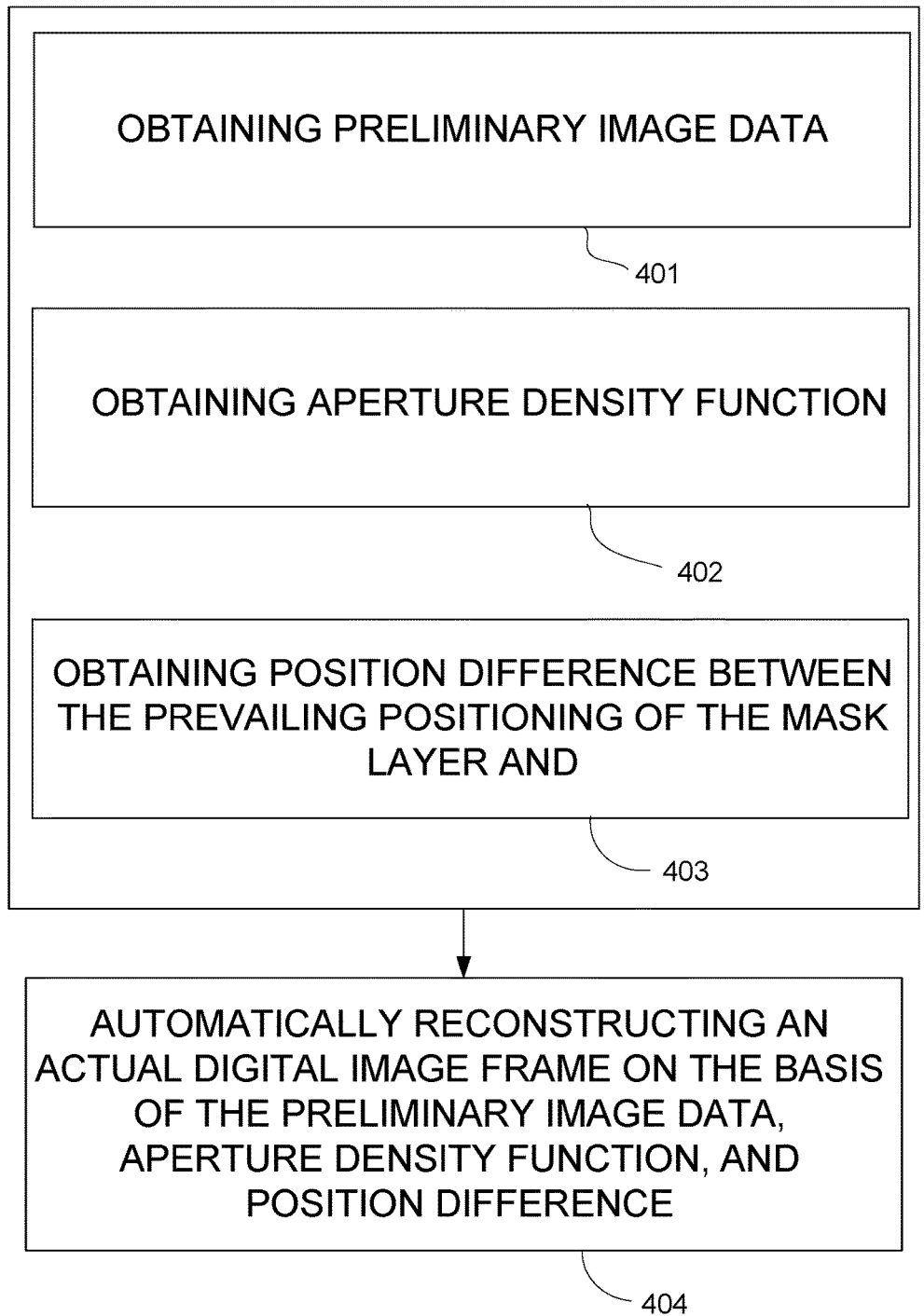
FIG. 4 illustrates a flow chart of a method for reconstructing a digital image frame.

The method of FIG. 4 comprises obtaining, in operation 401, preliminary image data, i.e. image data of a preliminary digital image frame captured of an object scene by a digital image sensor which may be in accordance with any of those discussed above or below. In some embodiments, the method may further comprise capturing the preliminary digital image frame, which may form part of the operation of obtaining it, or be carried out separately.

In operation 402, the aperture density function is obtained. A position difference between prevailing positioning of the mask layer in relation to the lens layer from a reference relative positioning thereof is obtained in operation 403. The operations of 401 to 403 may be carried out in any appropriate order.

In operation 404, an output digital image frame is automatically reconstructed, on the basis of the preliminary image data, the phase difference, and the aperture density function, the output digital image frame representing the object scene.

"Automatically" performing one or more operations refers to performing the operation(s) at issue by one or more appropriate data processing units or modules, such as the process units discussed above with reference to FIGS. 1 to 3, according to predetermined rules and procedures, without need for any contribution provided or determination performed by a user of an apparatus or device incorporating such unit or module. In addition to those operations specifically stated to be performed automatically, also other operations may be carried completely or partially automatically.

As illustrated in FIG. 2, to enable exposure of the entire array of pixels correctly also when there is a misalignment in the realized relative positioning 247 of the mask layer in relation to the lens layer 250, the lens layer may have a lens layer physical width $w_l$, the array of micro lenses comprising a number of j micro lenses 252 distributed for the lens layer physical width; and the mask layer has a mask layer physical width $w_m$ which is larger than the lens layer physical width, the array of micro apertures correspondingly comprising more than j (j+1 in the example of FIG. 2) micro apertures 242 distributed for the mask layer physical width. Then, slight misalignment between the mask layer and the lens layer does not necessarily cause pixels at an edge area of the sensor layer behind the lens array become exposed incorrectly, but there may be a micro aperture behind each micro lens.

Figure 5:
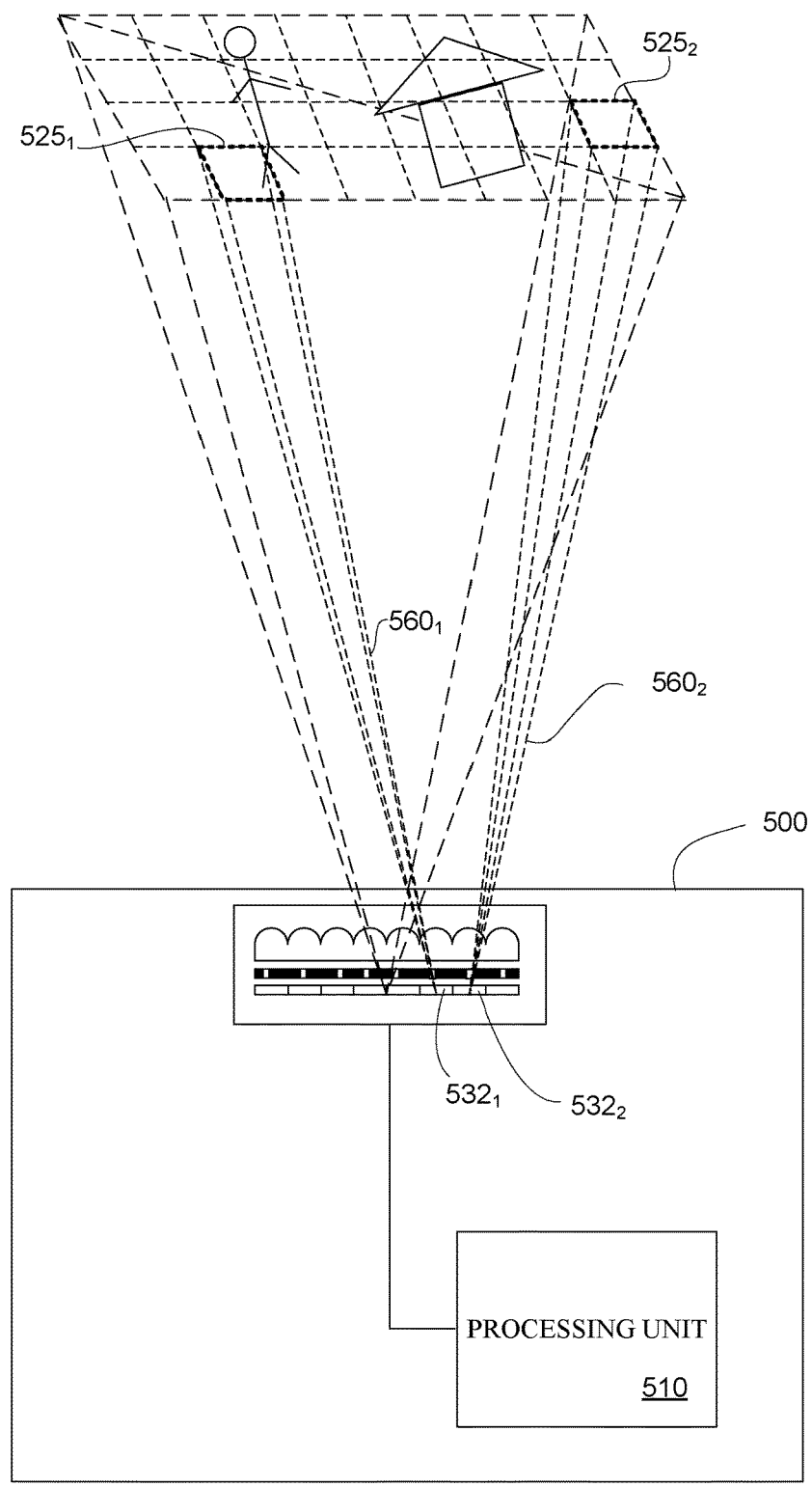
FIG. 5 illustrates schematically an apparatus with a digital image sensor.

The apparatus 500 of FIG. 1 may be generally in accordance with that discussed above with reference to FIGS. 1 to 3. As illustrated in FIG. 5, an aperture density function may define aperture positions resulting in partial fields of view $560_1$, $560_2$ of adjacent pixels $532_1$, $532_2$ directed to areas $525_1$, $515_2$ at the object scene 522 which are separated by area(s) viewed by other pixels(s). Therefore, the image data of the preliminary digital image frame does not directly allow formation of a digital image showing the captured object scene, but the entire image data of the preliminary digital image frame is again "mixed", corresponding to the mixing caused by the misalignment between the mask layer and the lens layer. However, the processing unit 510, carrying out operations as discussed above with reference to FIG. 3, may reconstruct an output digital image frame which correctly represents the object scene.

Embodiments are also possible where the aperture density function defines the aperture positions similarly to the example of FIG. 5, and where there is additionally misalignment of the sensor layer as discussed above with reference to FIGS. 2 and 3. Also then, an output digital image frame may be correctly reconstructed by utilizing the aperture density function and the information of the position difference d between prevailing positioning of the sensor layer relative to the lens layer from a reference relative positioning thereof.

"Obtaining" position difference, aperture density function, image data, or any other signal or data entity refers to any appropriate way of providing available, for automatic data processing and/or storage purposes, such signal or data entity. For example, such signal or data entity or a part thereof may be obtained via any appropriate wired or wireless data transmission path from another device or apparatus or another unit of the same apparatus, from an external data server or, for example, from a cloud service. Such signal or data entity or a part thereof may also be stored in or on any appropriate data storage unit, element, medium, or device, from which the processing unit may obtain the data content.

Obtaining a position difference between prevailing positioning of the sensor layer relative to the lens layer from a reference relative positioning thereof may comprise obtaining a ready determined position difference. Alternatively, the processing unit may be configured to obtain the position difference by carrying out a process of determining it. Such process may comprise, for example, obtaining image data of a test digital image frame captured of a test pattern by the digital image sensor, with a reference positioning between the test pattern and the digital image sensor. Further, image data of a reference digital image frame may obtained, the reference digital image frame resulting from capturing of the test pattern by a reference digital image sensor comprising a lens layer and a mask layer, similar to those of the digital image sensor, positioned in accordance with the reference relative positioning of the mask layer and the lens layer. The reference digital image sensor may be a real existing image sensor. Alternatively, it may be a simulated image sensor, on the basis of which simulated reference digital image frame may be generated.

The image data of the test digital image frame may be automatically compared with the image data of reference digital image frame, and the position difference may be determined on the basis of differences found in the comparison and the aperture density function. This is based on that the image data of the reference digital image frame represents the ideal situation with zero position difference, and deviations of the image data of the test digital image frame indicate a non-zero position difference which may be determined when the aperture density function, determining the directions of view of the partial fields of view of different pixels, is known.

The test pattern may be any known pattern suitable for determining the position difference on the basis of the test digital image frame.

Figure 6:
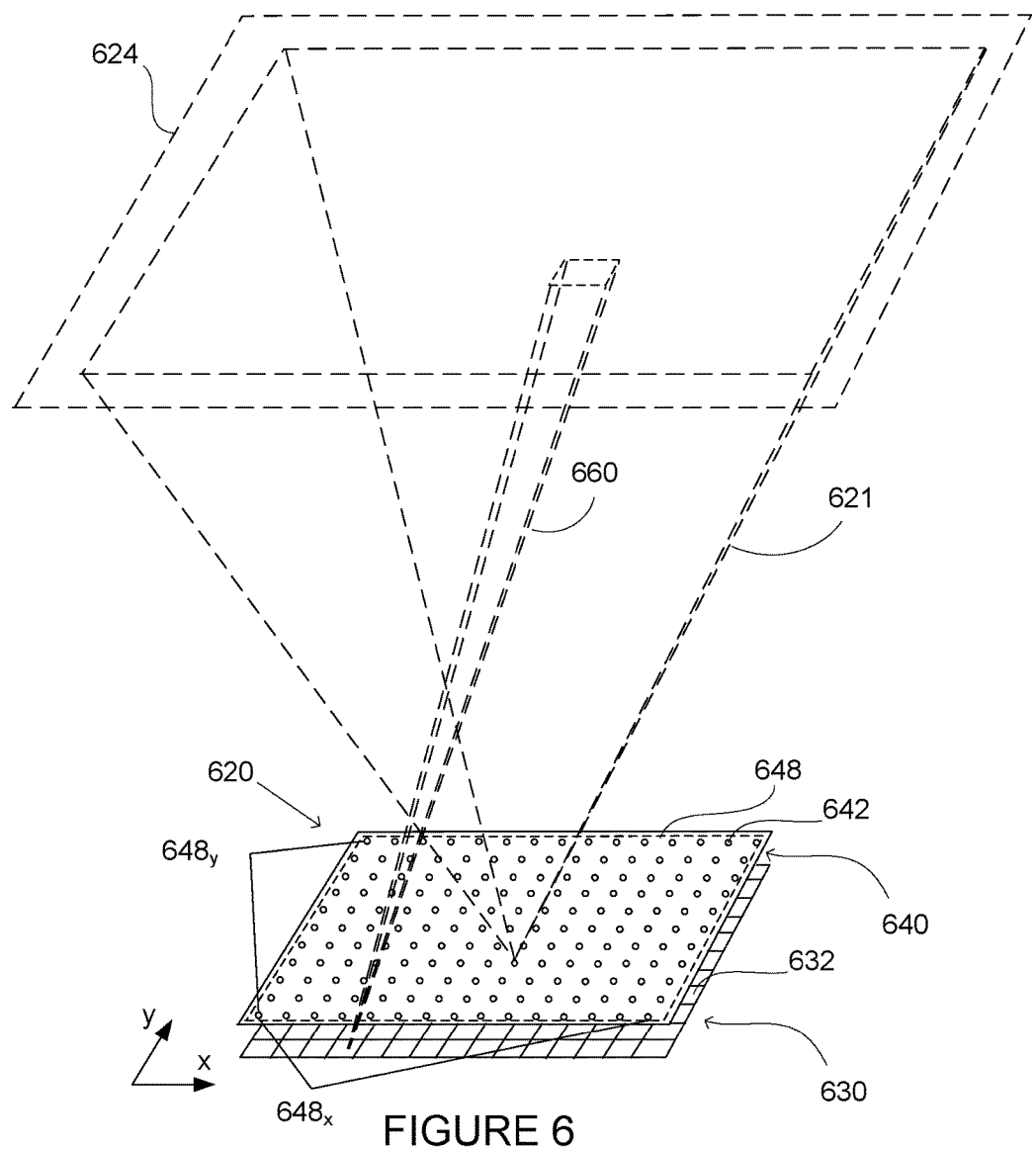
FIGS. 6 and 7 illustrate schematically digital image sensors.

The digital image sensor 620 which may be used in any apparatus discussed above and which is partially illustrated (without any lens layer) in FIG. 6, comprises a sensor layer 630 and mask layer 640. The micro apertures 642 are positioned in the mask layer at aperture positions in accordance with an aperture density function $F(i, p_i)$ which defines a two-directional sequence 648 of different aperture positions, the aperture positions of the sequence defining partial fields of view 660 together covering (only one partial field of view illustrated) the overall field of view 621 of the digital image sensor at an object plane.

The aperture density function of the example of FIG. 6 defines, for a first direction x, a first sequence $648_x$ of different aperture positions, and for a second direction y perpendicular to the first direction, a second sequence $648_y$ of different aperture positions, the first and the second sequences being orthogonal. Those sequences are pseudo noise, or pseudo random, sequences. Then, the density function may be considered as pseudo noise or pseudo random function. Both the orthogonality of the first and the second sections and, in particular, the pseudo noise nature thereof may advantageously contribute in eliminating repeating errors caused, for example, by possible manufacturing inaccuracies of the mask layer, lens layer or the sensor array, by a local sensor layer fault covering one or more pixels, or by an object on top of the digital image sensor. In the case of sequence(s) with periodic internal structure, such defects may cause repeating errors in the final digital image, easily visible for a human eye.

In other embodiments, other sequence types than pseudo noise sequences may be used, and/or it may be not necessary to have the first and the second sequences orthogonal.

In the digital image sensor 620 of FIG. 6, the array of light sensitive pixels 632 has a width of n pixels in the x direction and a width of m pixels in the y direction, and the first and the second sequences $648_x$, $648_y$ are repeating sequences having lengths of n and m, respectively.

Figure 7:
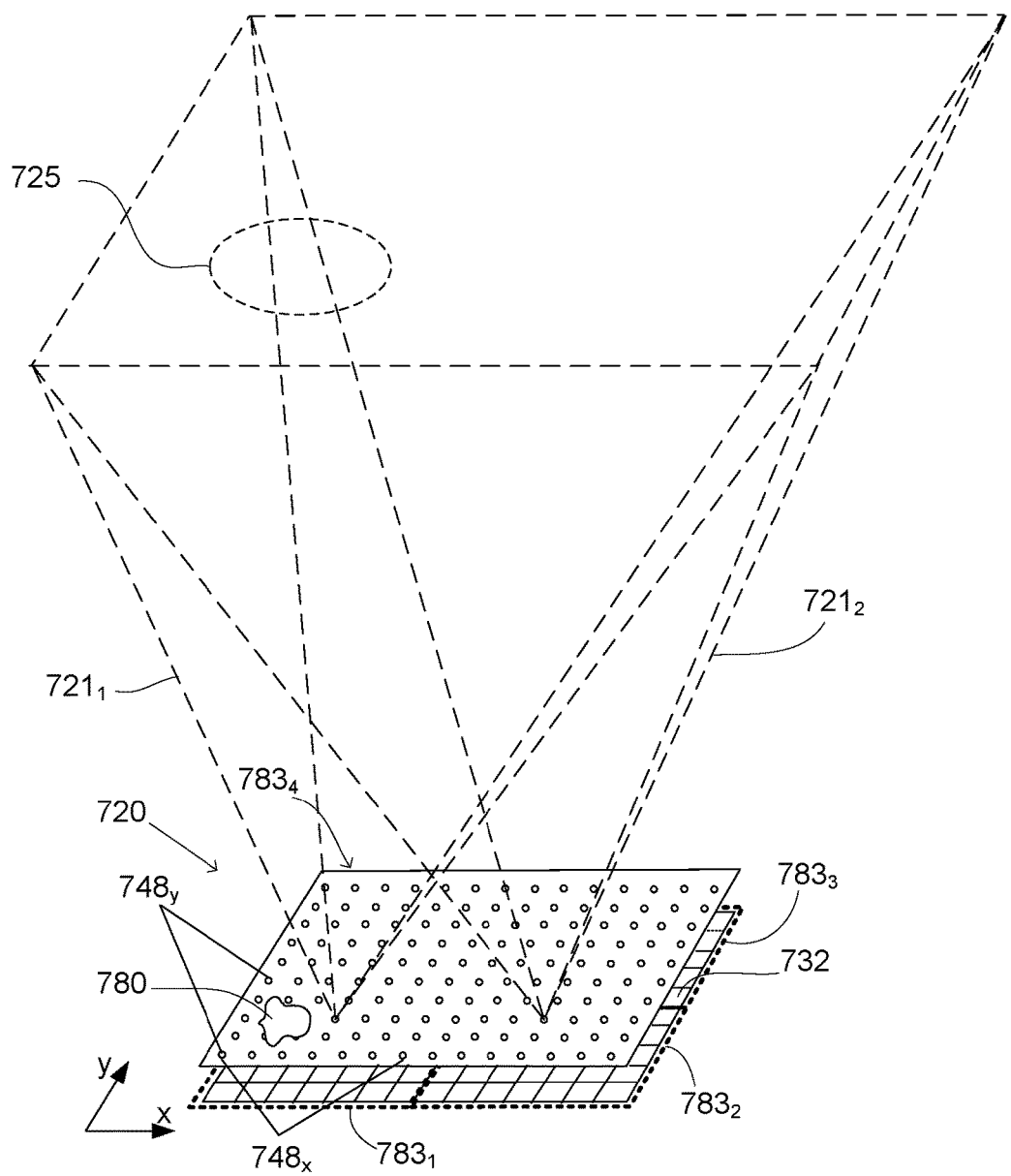

The digital image sensor 720 of FIG. 7 differs from that of FIG. 6 at least in that the array of light sensitive pixels 732 has a width of n pixels in the x direction and a width of m pixels in the y direction, and the first and the second sequences $748_x$, $748_y$ are repeating sequences having lengths of n/2 and m/2, whereby the array of pixels has four different pixel groups $738_1$, $738_2$, $738_3$, $738_4$, the partial fields of view of pixels of each group covering an overall field of view $721_1$, $721_2$ of the digital image sensor, with small parallax between the overall fields of view of the different regions. For the sake of clarity of the drawing, overall fields of view of two regions only are illustrated in FIG. 7. Then, each area 725 of the object scene is viewed by corresponding pixels of the at least two different regions from slightly different directions. Correspondingly, the processing unit may obtain preliminary image data originating from all pixel groups $738_1$, $738_2$, $738_3$, $738_4$. An output digital image frame may be reconstructed on the basis of image data originating from one single pixel group only. Alternatively, an output digital image frame may be reconstructed on the basis of image data originating from two or more different pixel groups.

In other embodiments, it is possible that only one of the first and the second sequences have a length of n/2 or m/2, respectively. Further in one or both directions, the sequence may have any length of n/(2*k) or m/(2*k) where k may be any integer higher than or equal to 2.

Dividing the aperture array into sequences each covering the entire width or area of the overall field of view of the image sensor enables various advantageous operations to be carried out by the processing unit. In one example, the processing unit is configured, in reconstructing the output digital image frame, to generate, on the basis of image data originating from corresponding pixels of the at least two different regions viewing a same area of the object scene, artificial image data corresponding a fictitious additional pixel. That way, for example, super resolution digital image frames may be generated.

As another example, the parallax, i.e. the partially differently directed partial fields of view of the different groups of the array of pixel may be utilized in removing from the output digital image frame any feature which is present in image data originating from only one or only some of the different pixel groups. Such feature may be caused, for example, by one or more defected pixels or by an object such as a small impurity particle close to or on the digital image sensor and thus visible to only one or some of the groups of the pixel array. In FIG. 7, an example of this is represented by an impurity particle 780 lying on the digital image sensor 720.

Figure 8:
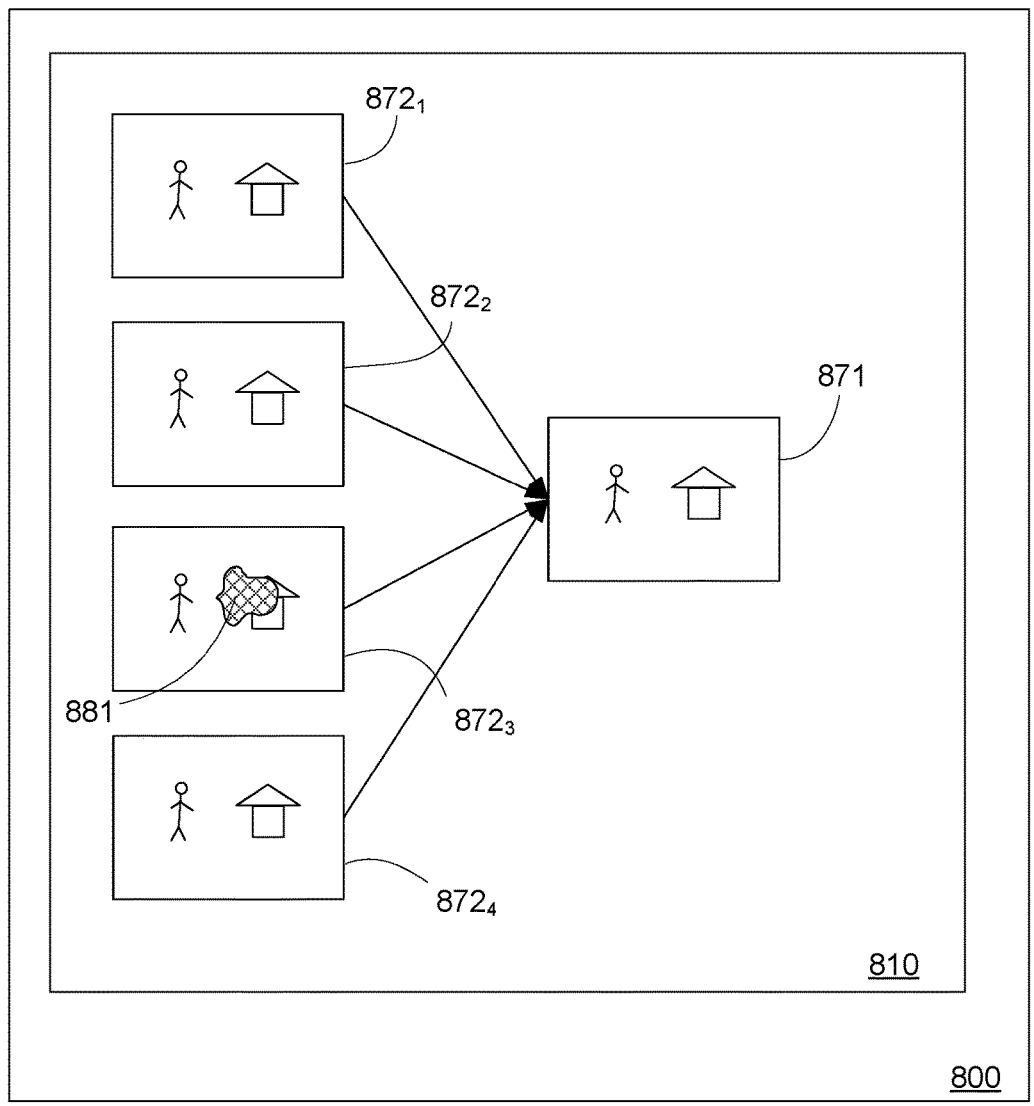
FIG. 8 illustrates schematically an apparatus and operation thereof.
Figure 9:
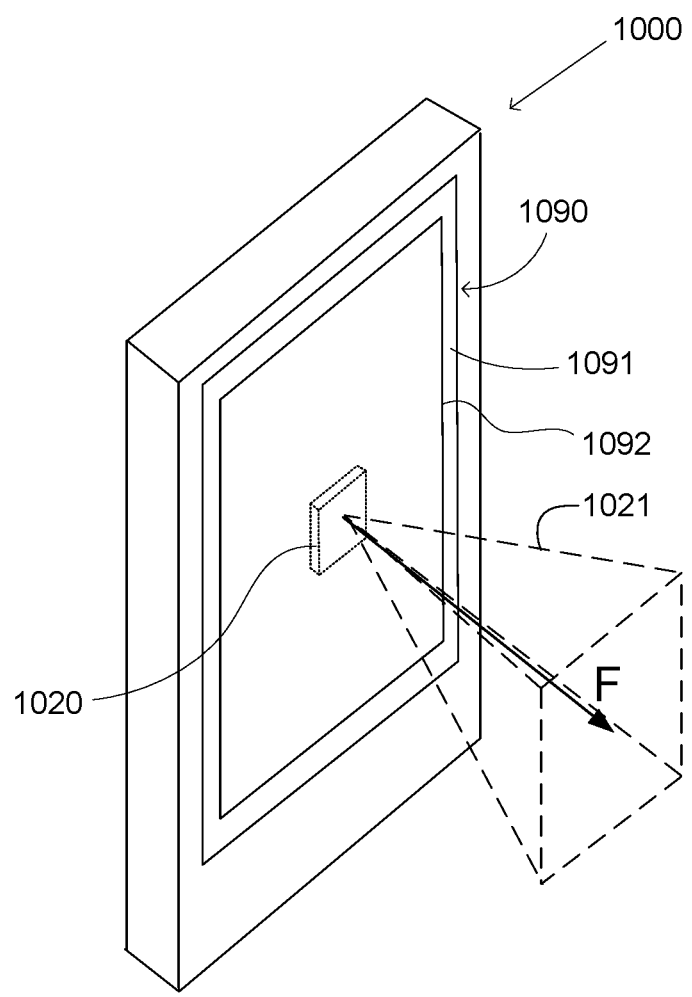
FIG. 9 illustrates schematically an apparatus with a digital image sensor and a display.

In FIG. 8, four different intermediate digital image frames $872_1$, $872_2$, $872_3$, $872_4$, reconstructed in accordance with the operations discussed above with reference to FIG. 3 on the basis of image data originating from the four groups 738 of pixels of the sensor layer 730, are illustrated. Image data of only one of them comprises a feature 881 caused by that impurity particle.

As illustrated in FIG. 8, the processing unit 810 of the apparatus 800 is configured to reconstruct the output digital image frame 871 so that the feature 881 is omitted therefrom.

In yet another example, the parallax may be utilized in that the wherein the processing unit is further configured to determine, on the basis of image data originating from at least two different regions of the array of light sensitive pixels, depth of at least one object location in the object scene relative to a reference location.

"Depth" refers generally to three-dimensional characteristics of objects present in the object scene. The "reference location" refers to a location on a fictitious reference plane relative to which plane the depth of the object location is determined. All object locations lying on any single plane which is parallel to such reference plane have the same depth of zero. On the other hand, deviation of the object location from such reference depth results in a non-zero depth of the object location.

In general, the reference location may be defined as coinciding with, or being otherwise related to, the location of the apparatus or the digital image sensor thereof. Then, the "depth" of the object relative to such reference location may be regarded as the distance of the object location from the apparatus or from another reference location defined relative to the device. Such approach may be used, for example, in distance measuring applications where distances of objects present in the target region, or specific points of such objects, from the device are to be measured. In an alternative approach, the reference location may lie within the object scene. In both cases, depth information may be determined for a plurality object locations, whereby it may be possible to determine the three-dimensional profiles of objects present in the object scene. Depth information may be used for various applications, such as three-dimensional mapping of surroundings of the device, or recognizing gestures or presence of a person, or a body part of a person, present in the target region. In the actual depth determination, any algorithms, methods, and principles known for depth sensing based on parallax may be applied.

The apparatus 1000 of FIG. 10 may be generally in accordance with any of the apparatuses discussed above. It comprises a display assembly 1090 comprising a display element 1091 having an operable displaying area 1092 and being configured to display visual information from the displaying area to a forward direction F.

The display element may comprise any appropriate display element type, such as a liquid crystal display (LCD) element or organic light emitting diode (OLED) display element. The display has a visually transparent active layer (not separately illustrated), i.e. a layer from which light is emitted to form the displayed visual information.

The digital image sensor 1020 of the apparatus 1000 lie in the display assembly, behind the transparent active layer, with the overall field of view 1021 directed to the forward direction F.

In other embodiments, a display element may have a non-transparent active layer, in which case the digital image sensor may lie in front of such active layer.

In the example of FIG. 10, the digital image sensor 1020 is positioned substantially at center of the operable displaying area 1092. Substantially central positioning may allow advantageous effects, for example, in allowing capturing images of user of the apparatus viewing the display, with the sight of the user directed directly towards the digital image sensor. In other embodiment, a digital image sensor may be positioned differently.

Some embodiments are further discussed shortly in the following.

In first aspect, an apparatus comprises a processing unit which is configured to obtain preliminary image data which is image data of a preliminary digital image frame captured of an object scene by a digital image sensor having an overall field of view and comprising a sensor layer comprising an array of light sensitive pixels; a mask layer in front of the sensor layer, the mask layer comprising an array of micro apertures positioned within aperture sites corresponding the positioning and size of the light sensitive pixels, and a lens layer comprising an array of micro lenses in front of the mask layer, the micro lenses being positioned within lens sites corresponding the positioning and size of the light sensitive pixels; a pixel of the sensor layer having a partial field of view defined by a micro aperture and a micro lens associated with the pixel, the partial field of view having a direction of view defined by relative horizontal position of the associated micro aperture in relation to the corresponding micro lens, the overall field of view of the digital image sensor being formed by the partial fields of view of the pixels; the micro apertures being positioned in the aperture sites at aperture positions defined by an aperture density function.

Further, processing unit is configured to obtain the aperture density function; obtain a position difference between prevailing positioning of the mask layer in relation to the lens layer from a reference relative positioning thereof; and reconstruct, on the basis of the preliminary image data, the position difference, and the aperture density function, an output digital image frame representing the object scene.

In an embodiment of the first aspect, the apparatus comprises the digital image sensor configured to capture the preliminary digital image frame.

In an embodiment of the first aspect, which may be in accordance with the previous embodiment, the lens layer has a lens layer physical width, the array of micro lenses comprising a number of j micro lenses distributed for the sensor layer physical width; and the mask layer has a mask layer physical width which is larger than the sensor layer physical width, the array of micro apertures correspondingly comprising more than j micro apertures distributed for the mask layer physical width.

In an embodiment of the first aspect, which may be in accordance with any of the preceding embodiments of the first aspect, the aperture density function defines aperture positions resulting in partial fields of view of adjacent pixels directed to areas at the object scene which are separated by area(s) viewed by other pixels(s).

In an embodiment of the first aspect, which may be in accordance with any of the preceding embodiments of the first aspect, the aperture density function defines a two-directional sequence of different aperture positions, the aperture positions of the sequence defining partial fields of view covering the overall field of view.

In an embodiment of the first aspect in accordance with the previous embodiment, the sequence is a pseudo noise sequence.

In an embodiment of the first aspect in accordance with any of the two preceding embodiments, the two-dimensional sequence comprises, for a first direction, a first sequence of different aperture positions, and for a second direction perpendicular to the first direction, a second sequence of different aperture positions, the first and the second sequences being orthogonal.

In an embodiment of the first aspect in accordance with any of the three preceding embodiments, the array of light sensitive pixels has a width of n pixels, and the sequence has a length of n.

In an alternative embodiment of the first aspect in accordance with any of the three embodiments preceding the previous embodiment, the array of light sensitive pixels has a width of n pixels, and the sequence is a repeating sequence having a length of n/(2*k), where k is an integer, whereby the array of pixels has at least two different pixel groups with the partial fields of view of pixels of each group covering the overall field of view, and each area of the object scene is viewed by corresponding pixels of the at least two different groups from slightly different directions.

In an embodiment of the first aspect in accordance with the previous embodiment, the processing unit is configured, in reconstructing the output digital image frame, to generate, on the basis of image data originating from corresponding pixels of the at least two different pixel groups viewing a same area of the object scene, artificial image data corresponding a fictitious additional pixel.

In an embodiment of the first aspect in accordance with the embodiment preceding the previous embodiment, which may be further in accordance with the previous embodiment, the processing unit is configured, in reconstructing the output digital image frame, detect a feature which is present in image data originating from one or more of the at least two different pixel groups but absent in image data originating from one or more other pixel groups of the at least two different pixel groups, and omit that feature in the output digital image frame.

In an embodiment of the first aspect in accordance with the embodiment preceding the two previous embodiments, which may be further in accordance with any of the two the previous embodiments, the processing unit is further configured to determine, on the basis of image data originating from at least two different pixel groups, depth of at least one object location in the object scene relative to a reference location.

In an embodiment of the first aspect in accordance with any of the preceding embodiments of the first aspect where the apparatus comprises the digital image sensor, the apparatus further comprises a display assembly comprising a display element having an operable displaying area and being configured to display visual information from the displaying area to a forward direction; the digital image sensor lying in the display assembly with the overall field of view directed to the forward direction.

In an embodiment of the first aspect in accordance with the previous embodiment, the digital image sensor is positioned substantially at center of the operable displaying area.

In an embodiment of the first aspect, which may be in accordance with any of the preceding embodiments of the first aspect, the apparatus is implemented as one of a laptop computer, a tablet computer, a smartphone, a mobile phone, and a wearable electronic device.

In a second aspect, a digital image sensor having an overall field of view comprises a sensor layer comprising an array of light sensitive pixels; a mask layer in front of the array of light sensitive pixels, the mask layer comprising an array of micro apertures positioned within aperture sites corresponding the positioning and size of the light sensitive pixels, and an array of micro lenses in front of the mask layer, the micro lenses being positioned within lens sites corresponding the positioning and size of the light sensitive pixels; a pixel of the sensor layer having a partial field of view defined by a micro aperture and a micro lens associated with the pixel, the overall field of view of the digital image sensor being formed by the partial fields of view of the pixels, the partial field of view of a pixel being defined by relative horizontal position of the associated micro aperture in relation to the corresponding micro lens, the micro apertures being positioned in the aperture sites as aperture positions defined by an aperture density function defining a two-directional sequence of different aperture positions, the aperture positions of the sequence defining partial fields of view covering the overall field of view.

In an embodiment of the second aspect, the lens layer has a lens layer physical width, the array of micro lenses comprising a number of j micro lenses distributed for the sensor layer physical width; and the mask layer has a mask layer physical width which is larger than the sensor layer physical width, the array of micro apertures correspondingly comprising more than j micro apertures distributed for the mask layer physical width.

In an embodiment of the second aspect, which may be in accordance with the previous embodiment, the aperture density function defines aperture positions resulting in partial fields of view of adjacent pixels directed to areas at the object scene which are separated by area(s) viewed by other pixels(s).

In an embodiment of the second aspect, which may be in accordance with any of the preceding embodiments of the second aspect, the sequence defined by the density function is a pseudo noise sequence.

In an embodiment of the second aspect, which may be in accordance with any of the preceding embodiments of the second aspect, the two-dimensional sequence comprises, for a first direction, a first sequence of different aperture positions, and for a second direction perpendicular to the first direction, a second sequence of different aperture positions, the first and the second sequences being orthogonal.

In an embodiment of the second aspect, which may be in accordance with any of the preceding embodiments of the second aspect, the array of light sensitive pixels has a width of n pixels, and the sequence has a length of n.

In an alternative embodiment of the second aspect, which may be in accordance with any of the embodiments of the second aspect preceding the previous embodiment, the array of light sensitive pixels has a width of n pixels, and the sequence is a repeating sequence having a length of n/(2*k), where k is an integer. Then, the array of pixels has at least two different pixel groups with the partial fields of view of pixels of each group covering the overall field of view, and each area of the object scene is viewed by corresponding pixels of the at least two different groups from slightly different directions.

In a third aspect, a method comprises obtaining preliminary image data which is image data of a preliminary digital image frame captured of an object scene by a digital image sensor having an overall field of view and comprising a sensor layer comprising an array of light sensitive pixels; a mask layer in front of the sensor layer, the mask layer comprising an array of micro apertures positioned within aperture sites corresponding the positioning and size of the light sensitive pixels, and a lens layer comprising an array of micro lenses in front of the mask layer, the micro lenses being positioned within lens sites corresponding the positioning and size of the light sensitive pixels; a pixel of the sensor layer having a partial field of view defined by a micro aperture and a micro lens associated with the pixel, the partial field of view having a direction of view defined by relative horizontal position of the associated micro aperture in relation to the corresponding micro lens, the overall field of view of the digital image sensor being formed by the partial fields of view of the pixels; the micro apertures being positioned in the aperture sites at aperture positions defined by an aperture density function.

The method further comprises obtaining the aperture density function; obtaining a position difference between prevailing positioning of the mask layer in relation to the lens layer from a reference relative positioning thereof; and automatically reconstructing, on the basis of the preliminary image data, the phase difference, and the aperture density function, an output digital image frame representing the object scene.

In an embodiment of the third aspect, the method further comprises automatically capturing the preliminary digital image frame.

In an embodiment of the third aspect, which may be in accordance with the previous embodiment, the lens layer has a lens layer physical width, the array of micro lenses comprising a number of j micro lenses distributed for the sensor layer physical width; and the mask layer has a mask layer physical width which is larger than the sensor layer physical width, the array of micro apertures correspondingly comprising more than j micro apertures distributed for the mask layer physical width.

In an embodiment of the third aspect, which may be in accordance with any of the preceding embodiments of the third aspect, the aperture density function defines aperture positions resulting in partial fields of view of adjacent pixels directed to areas at the object scene which are separated by area(s) viewed by other pixels(s).

In an embodiment of the third aspect, which may be in accordance with any of the preceding embodiments of the third aspect, the aperture density function defines a two-directional sequence of different aperture positions, the aperture positions of the sequence defining partial fields of view covering the overall field of view.

In an embodiment of the third aspect in accordance with the previous embodiment, the sequence is a pseudo noise sequence.

In an embodiment of the third aspect in accordance with any of the two preceding embodiments, the two-dimensional sequence comprises, for a first direction, a first sequence of different aperture positions, and for a second direction perpendicular to the first direction, a second sequence of different aperture positions, the first and the second sequences being orthogonal.

In an embodiment of the third aspect in accordance with any of the three preceding embodiments, the array of light sensitive pixels has a width of n pixels, and the sequence has a length of n.

In an alternative embodiment of the third aspect in accordance with any of the three embodiments preceding the previous embodiment, the array of light sensitive pixels has a width of n pixels, and the sequence is a repeating sequence having a length of n/(2*k), where k is an integer, whereby the array of pixels has at least two different pixel groups with the partial fields of view of pixels of each group covering the overall field of view, and each area of the object scene is viewed by corresponding pixels of the at least two different groups from slightly different directions.

In an embodiment of the third aspect in accordance with the previous embodiment, the method comprises, in reconstructing the output digital image frame, automatically generating, on the basis of image data originating from corresponding pixels of the at least two different pixel groups viewing a same area of the object scene, artificial image data corresponding a fictitious additional pixel.

In an embodiment of the third aspect in accordance with the embodiment preceding the previous embodiment, which may be further in accordance with the previous embodiment, the method comprises, in reconstructing the output digital image frame, automatically detecting a feature which is present in image data originating from one or more of the at least two different pixel groups but absent in image data originating from one or more other pixel groups of the at least two different pixel groups, and omitting that feature in the output digital image frame.

In an embodiment of the third aspect in accordance with the embodiment preceding the two previous embodiments, which may be further in accordance with any of the two the previous embodiments, the method further comprises automatically determining, on the basis of image data originating from at least two different pixel groups, depth of at least one object location in the object scene relative to a reference location.

In a further aspect, a computer program comprises program code which, when executed by at least one processor incorporated in an apparatus, causes the at least one processor and/or the apparatus to carry out the operations of the method of the third aspect or any embodiments thereof. Such apparatus may comprise a digital image sensor in accordance with that of the second aspect or any embodiment thereof. In yet further aspect, a computer-readable medium comprises a computer program as discussed above.

The processing units of the embodiments illustrated and described herein as well as embodiments not specifically described herein but within the scope of aspects of the claims constitute example means for reconstructing an output digital image frame representing an object scene, the reconstruction being carried out on the basis of image data of a preliminary digital image frame captured of the object scene by a digital image sensor which may be a flat digital image sensor and comprises a sensor layer, a mask layer with a micro aperture array, and a lens layer comprising a micro lens layer; a position difference between prevailing relative positioning between the mask layer and the lens layer from a reference relative positioning; and an aperture density function determining aperture positions where the micro aperture are positioned in the mask layer.

Although some of the present embodiments may be described and illustrated as being implemented in a smartphone, a mobile phone, or a tablet computer, these are only examples of a device and not a limitation. As those skilled in the art will appreciate, the present embodiments are suitable for application in a variety of different types of devices, such as portable and portable devices, for example, in lap upper computers, tablet computers, game consoles or game controllers, various wearable devices, etc.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

The invention claimed is:

1. An apparatus comprising a processor configured to obtain preliminary image data which is image data of a preliminary digital image frame captured of an object scene by a digital image sensor having an overall field of view and comprising:
   a sensor layer comprising an array of light sensitive pixels;
   a mask layer in front of the sensor layer, the mask layer comprising an array of micro apertures positioned within aperture sites corresponding the positioning and size of the light sensitive pixels, and
   a lens layer comprising an array of micro lenses in front of the mask layer, the micro lenses being positioned within lens sites corresponding the positioning and size of the light sensitive pixels;
   a pixel of the sensor layer having a partial field of view defined by a micro aperture and a micro lens associated with the pixel, the partial field of view having a direction of view defined by relative horizontal position of the associated micro aperture in relation to the corresponding micro lens, the overall field of view of the digital image sensor being formed by the partial fields of view of the pixels;

the micro apertures being positioned in the aperture sites at aperture positions defined by an aperture density function;
obtain the aperture density function;
obtain a position difference between prevailing positioning of the mask layer in relation to the lens layer from a reference relative positioning thereof; and
reconstruct, on the basis of the preliminary image data, the position difference, and the aperture density function, an output digital image frame representing the object scene.

2. An apparatus as defined in claim 1 comprising the digital image sensor configured to capture the preliminary digital image frame.

3. An apparatus as defined in claim 2, further comprising a display assembly comprising a display element having an operable displaying area and being configured to display visual information from the displaying area to a forward direction; the digital image sensor lying in the display assembly with the overall field of view directed to the forward direction.

4. An apparatus as defined in claim 3, wherein the digital image sensor is positioned substantially at center of the operable displaying area.

5. An apparatus as defined in claim 1, wherein the lens layer has a lens layer physical width, the array of micro lenses comprising a number of j micro lenses distributed for the sensor layer physical width; and the mask layer has a mask layer physical width which is larger than the sensor layer physical width, the array of micro apertures correspondingly comprising more than j micro apertures distributed for the mask layer physical width.

6. An apparatus as defined in claim 1, wherein the aperture density function defines aperture positions resulting in partial fields of view of adjacent pixels directed to areas at the object scene which are separated by area(s) viewed by other pixels(s).

7. An apparatus as defined in claim 1, wherein the aperture density function defines a two-directional sequence of different aperture positions, the aperture positions of the sequence defining partial fields of view covering the overall field of view.

8. An apparatus as defined in claim 7, wherein the sequence is a pseudo noise sequence.

9. An apparatus as defined in claim 7, wherein the two-dimensional sequence comprises, for a first direction, a first sequence of different aperture positions, and for a second direction perpendicular to the first direction, a second sequence of different aperture positions, the first and the second sequences being orthogonal.

10. An apparatus as defined in claim 7, wherein the array of light sensitive pixels has a width of n pixels, and the sequence has a length of n.

11. An apparatus as defined in claim 7, wherein the array of light sensitive pixels has a width of n pixels, and the sequence is a repeating sequence having a length of n/(2*k), where k is an integer, whereby the array of pixels has at least two different pixel groups with the partial fields of view of pixels of each group covering the overall field of view, and each area of the object scene is viewed by corresponding pixels of the at least two different groups from slightly different directions.

12. An apparatus as defined in claim 11, wherein the processor is configured, in reconstructing the output digital image frame, to generate, on the basis of image data originating from corresponding pixels of the at least two different pixel groups viewing a same area of the object scene, artificial image data corresponding a fictitious additional pixel.

13. An apparatus as defined in claim 11, wherein the processor is configured, in reconstructing the output digital image frame, detect a feature which is present in image data originating from one or more of the at least two different pixel groups but absent in image data originating from one or more other pixel groups of the at least two different pixel groups, and omit that feature in the output digital image frame.

14. An apparatus as defined in claim 11, wherein the processor is further configured to determine, on the basis of image data originating from at least two different pixel groups, depth of at least one object location in the object scene relative to a reference location.

15. An apparatus as defined in claim 1, implemented as one of a laptop computer, a tablet computer, a smartphone, a mobile phone, and a wearable electronic device.

16. A digital image sensor having an overall field of view and comprising:
a sensor layer comprising an array of light sensitive pixels;
a mask layer in front of the array of light sensitive pixels, the mask layer comprising an array of micro apertures positioned within aperture sites corresponding the positioning and size of the light sensitive pixels, and
an array of micro lenses in front of the mask layer, the micro lenses being positioned within lens sites corresponding the positioning and size of the light sensitive pixels;
a pixel of the sensor layer having a partial field of view defined by a micro aperture and a micro lens associated with the pixel, the overall field of view of the digital image sensor being formed by the partial fields of view of the pixels, the partial field of view of a pixel being defined by relative horizontal position of the associated micro aperture in relation to the corresponding micro lens, the micro apertures being positioned in the aperture sites as aperture positions defined by an aperture density function defining a two-directional sequence of pseudo randomly arranged different aperture positions, the two-dimensional sequence comprising a first sequence pseudo randomly arranged for a first direction and a second sequence pseudo randomly arranged for a second direction, the first and second sequences being different, the first and second directions being different, and the aperture positions of the sequence defining partial fields of view covering the overall field of view.

17. A digital image sensor as defined in claim 16, wherein the sequence defined by the density function is a pseudo noise sequence.

18. A digital image sensor as defined in claim 16, wherein the array of light sensitive pixels has a width of n pixels, and the sequence has a length of n/(2*k), where k is an integer.

19. A method comprising:
obtaining preliminary image data which is image data of a preliminary digital image frame captured of an object scene by a digital image sensor having an overall field of view and comprising
a sensor layer comprising an array of light sensitive pixels;
a mask layer in front of the sensor layer, the mask layer comprising an array of micro apertures positioned within aperture sites corresponding the positioning and size of the light sensitive pixels, and a lens layer comprising an array of micro lenses in front of the mask layer, the micro lenses being positioned within lens sites corresponding the positioning and size of the light sensitive pixels;

a pixel of the sensor layer having a partial field of view defined by a micro aperture and a micro lens associated with the pixel, the partial field of view having a direction of view defined by relative horizontal position of the associated micro aperture in relation to the corresponding micro lens, the overall field of view of the digital image sensor being formed by the partial fields of view of the pixels;

the micro apertures being positioned in the aperture sites at aperture positions defined by an aperture density function;

obtaining the aperture density function;

obtaining a position difference between prevailing positioning of the mask layer in relation to the lens layer from a reference relative positioning thereof; and automatically reconstructing, on the basis of the preliminary image data, the phase difference, and the aperture density function, an output digital image frame representing the object scene.

20. A method as defined in claim 19 further comprising automatically capturing the preliminary digital image frame.

* * * * *